(12) United States Patent  
Hurst

(10) Patent No.: US 8,423,939 B1  
(45) Date of Patent: Apr. 16, 2013

(54) BOUNDARY BUFFERS TO MODEL REGISTER INCOMPATIBILITY DURING PRE-RETIMING OPTIMIZATION

(75) Inventor: Aaron Hurst, San Francisco, CA (US)

(73) Assignee: Cadence Design Systems, Inc., San Jose, CA (US)

(*) Notice: Subject to any disclaimer, the term of this patent is extended or adjusted under 35 U.S.C. 154(b) by 215 days.

(21) Appl. No.: 12/754,724

(22) Filed: Apr. 6, 2010

(51) Int. Cl.
*G06F 17/50* (2006.01)
*G06F 9/455* (2006.01)

(52) U.S. Cl.
USPC ........... 716/114; 716/108; 716/113; 716/134; 703/19

(58) Field of Classification Search ................. None
See application file for complete search history.

(56) References Cited

U.S. PATENT DOCUMENTS

| | | | | |
|---|---|---|---|---|
| 5,355,321 | A * | 10/1994 | Grodstein et al. | 716/108 |
| 7,360,190 | B1 * | 4/2008 | Singh et al. | 716/113 |
| 2008/0276212 | A1 * | 11/2008 | Albrecht | 716/10 |
| 2009/0106724 | A1 * | 4/2009 | Arsovski et al. | 716/7 |
| 2009/0254874 | A1 * | 10/2009 | Bose | 716/6 |

OTHER PUBLICATIONS

C. E. Leiseerson and J. B. Saxe, "Retiming Synchronous Circuitry", Algorithmica, vol. 6(1) pp. 5-35, 1991.
J. P. Fishburn, "Clock Skew Optimization," IEEE Transactions on Computers, vol. 39, pp. 945-951, Jul. 1990.

* cited by examiner

*Primary Examiner* — A. M. Thompson
(74) *Attorney, Agent, or Firm* — Holland & Knight LLP; Mark H. Whittenberger

(57) ABSTRACT

Methods, systems, and machine-readable storage medium for logic synthesis that adjust a timing model of a circuit are provided. A first memory element from multiple memory elements of the circuit may be determined, where the first memory element is connected with a first portion of the circuit and is controlled by at least one first control signal. A combinational element within the first portion of the circuit may be determined. The combinational element may include at least one input or output coupled with a second memory element. The second memory element may be controlled by at least one second control signal. The second control signal may be incompatible with the first control signal. A first timing element may be inserted into the circuit at a location connecting the first timing element with the combinational element. A synthesis optimization may be performed utilizing the at least one first timing element.

23 Claims, 6 Drawing Sheets

BOUNDARY BUFFERS TO MODEL REGISTER INCOMPATIBILITY DURING PRE-RETIMING OPTIMIZATION

BACKGROUND

This disclosure relates in general to electronic design automation (EDA) and, more specifically, logic synthesis of a circuit involving retiming.

Retiming is a technique of logic synthesis optimization that relocates registers such as flip-flops, or memory elements more generally, in a circuit in a manner that preserves the output functionality. Retiming may be applied to achieve different purposes, such as to minimize or to meet a constraint on a worst case combinational delay and/or to minimize the number of registers. Because the movement of registers redistributes timing slack in the design, retiming may dramatically alter the relative timing criticality at any given point in the design. Paths with significant slack may become critical after retiming, and paths that are initially critical may be easily fixed.

It may therefore be beneficial to provide an early estimate of the post-retiming/sequential timing model to the synthesis operations that occur before its application. This may avoid unnecessarily improving timing of non-critical components and/or unintentionally degrading elements that are critical in the post-retiming result. It also provides the earlier optimizations an additional degree of freedom to dynamically explore various configurations that may induce different register placement.

While it is possible to formulate fully sequential timing aware optimization algorithms that as such are inherently retiming aware, such approaches are experimental and not widespread in industry at this time. A practical alternative is to inject information about the sequential criticality into an existing combinational flow. This can be accomplished by adjusting the timing model.

If a circuit design is to be retimed, the quality of the final result can be improved by adjusting the timing model of the synthesis steps prior to retiming to account for the subsequent ability to relocate the registers. Two examples of how this can be accomplished include (i) temporarily replacing some registers with virtual negative-delay buffers, mapping across multi-cycle paths, and allowing the delay to be appropriately distributed into each cycle with retiming or (ii) adjusting the timing constraints at each register (e.g., by adding an intentional clock skew) to simulate its predicted structural movement. These timing adjustments occur at the original location of the register.

A problem with both of these techniques, however, is that they are unable to account for limitations on register movement and merging due to incompatible clock, reset, voltage, or enable signals, or other features, merely by way of example. In particular, when a register is replicated during retiming and each of its copies is differently constrained, no single adjustment at its original location (e.g., to the negative delay buffer or the intentional clock skew) may correctly capture the different timing along multiple fan-in/fan-out paths.

Thus, the existing approaches to modeling incompatible registers generally limit the timing adjustment at the original register location based upon the minimum or maximum compatible movement along any fan-in/fan-out path from the register. With the minimum limit, it may be assumed that retiming can only move a register as far as it can along the most-constrained path and may therefore be over-conservative; with the maximum limit, it may be assumed that retiming can move a register as far as it can along the least-constrained path and may therefore be an over-approximation. With the over-conservative limitation of register compatibility, the less-constrained paths may appear overly timing-critical. The pre-retiming optimization may not fully exploit the ability of the subsequent retiming to balance slacks, and the quality of final result (in terms of timing, area, or any other metric of interest) may be sub-optimal. With the over-approximation of the register movement, the pre-retiming optimization may assume that retiming can compensate for a timing imbalance that it may not actually be correctable due to register compatibility. The result may be a circuit with timing violations or with sub-optimal timing; it is possible for the timing of the final result to be worse than that of the original. Intermediate bounds are also possible but simultaneously suffer from both of the above limitations.

There is thus a need for methods, systems, and apparatuses that may be used for logic synthesis that are not limited to timing adjustments at the original register locations and that may not suffer from the limitations of the existing techniques.

BRIEF SUMMARY

Methods, systems, and machine-readable storage medium are provided that involve additional timing adjustments at locations different from the original locations of memory elements in a circuit as part of a logic synthesis. A timing element is introduced that can be inserted into a circuit representation, such as a netlist, to simulate the timing under the different limitations (due to register incompatibility, for example) imposed on retiming a memory element along each fan-in or fan-out path from the memory element. These timing elements may be non-physical objects with a prescribed timing model and may be temporarily inserted into the circuit description during a pre-retiming optimization, for example. These timing elements may be referred to as retiming boundary buffers.

These timing elements can be utilized to capture the ability of the subsequent retiming to move registers to balance delays under compatibility constraints. There can be more freedom to optimize and to improve the desired characteristics with the relaxed timing constraints. The disclosed methods, systems, and apparatuses can be compatible with existing techniques, including netlist-based techniques. The timing elements can be transparent to most optimizations; their effect can be merely on the underlying timing analysis. In general, new constraint-types may not need to be introduced. Algorithmic changes may not be necessary to incorporate them.

Embodiments may include methods of logic synthesis for adjusting a timing model of a circuit. Methods may include providing the circuit. The circuit may include multiple memory elements. A first memory element from the multiple memory elements may be determined. The first memory element may be connected with a first portion of the circuit. The first memory element may be controlled by at least one first control signal. The at least one control signal may include at least one clock signal, one reset signal, one enable signal, or one power signal. At least one combinational element within the first portion of the circuit may be determined. The at least one combinational element may include at least one input or output coupled with a second memory element of the multiple memory elements. The second memory element may be controlled by at least one second control signal. The at least one second control signal may include at least one clock signal, one reset signal, one enable signal, or one power signal. The at least one second control signal may be incompatible with the at least one first control signal. At least one first timing element may be inserted into the circuit at a location connecting the at least one first timing element with the at least one combinational element. A synthesis optimization may be performed utilizing the at least one first timing element.

In some embodiments, the at least one first timing element may disallow a slack value from being borrowed across the at least one combinational element. Some embodiments may include inserting at least one second timing element into the circuit at a location of at least the first memory element or the second memory element. In some embodiments, the at least one second timing element may include a clock skew element. In some embodiments, the at least one second timing element may include a buffer element, where the buffer element may adjust the timing model of the circuit by introducing a delay into a propagated signal of the circuit.

In some embodiments, the first timing element may include a forward timing element with a set of timing properties expressed as:

$$a_{out} = \max(a_{in}, -kT)$$

$$r_{in} = r_{out}$$

where:

$a_{out}$ is a latest arrival time at an output of the first timing element;

$a_{in}$ is a latest arrival time at an input of the first timing element;

k is a number of levels of memory elements that lie between the location of the first memory element and the at least one combinational element;

T is a clock period of a next memory element in a direction of a timing propagation;

$r_{in}$ is an earliest required time at the input of the first timing element; and $r_{out}$ is an earliest required time at the output of the first timing element.

In some embodiments, the first timing element may include a backward timing element with a set of timing properties expressed as:

$$r_{in} = \min(r_{out}, (k+1)T)$$

$$a_{out} = a_{in}$$

where:

$a_{out}$ a latest arrival time at an output of the first timing element;

$a_{in}$ is a latest arrival time at an input of the first timing element;

k is a number of levels of memory elements that lie between the location of the first memory element and the at least one combinational element;

T is a clock period of a next memory element in a direction of a timing propagation;

$r_{in}$ is an earliest required time at the input of the first timing element; and $r_{out}$ is an earliest required time at the output of the first timing element.

In some embodiments, the synthesis optimization may include a technology mapping.

Some embodiments may include a machine-readable storage medium including executable instructions for performing logic synthesis that adjusts a timing model of a circuit. In some embodiments, the executable instructions may include code for providing the circuit. The circuit may include multiple memory elements. A first memory element from the multiple memory elements may be determined, where the first memory element may be controlled by a first signal and is coupled with a first portion of the circuit. At least one combinational element within the first portion of the circuit may be determined, where the at least one combinational element may include at least one input or output coupled with a second memory element of the multiple memory elements. The second memory element may be controlled by a second signal, where the second signal may be incompatible with the first signal. At least one first timing element may be inserted into the circuit at location connecting the at least one first timing element with the at least one combinational element. A synthesis optimization utilizing the at least one first timing element may be performed.

In some embodiments of a machine-readable storage medium including executable instructions for performing logic synthesis that adjusts a timing model of a circuit, the at least one first timing element may disallow a slack value from being borrowed across the at least one combinational element. In some embodiments, the executable instructions may further include inserting at least one second timing element into the circuit at a location of at least the first memory element or the second memory element. In some embodiments, the at least one second timing element may include a clock skew element. In some embodiments, the at least one second timing element may include a buffer element, where the buffer element may adjust the timing model of the circuit by introducing a delay into a propagated signal of the circuit. In some embodiments, the first control signal and the second control signal may include at least a clock signal, a reset signal, a voltage signal, or an enable signal. In some embodiments, the synthesis optimization may include a technology mapping.

Some embodiments may include a system for performing logic synthesis that adjusts a timing model of a circuit before retiming. The system may include a storage medium. The system may include a processor coupled with the storage medium. The processor may be configured to perform logic synthesis that adjusts the timing model of the circuit by a configuration to produce the circuit, where the circuit includes multiple memory elements. The processor may be configured to perform logic synthesis that adjusts the timing model of the circuit by a configuration to determine a first memory element from the multiple memory elements, where the first memory element may be a member of a first memory element class and may be coupled with a first portion of the circuit. The processor may be configured to perform logic synthesis that adjusts the timing model of the circuit by a configuration to determine at least one combinational element within the first portion of the circuit, where the at least one combinational element may include at least one input or output coupled with a second memory element of the multiple memory elements. The second memory element may include a member of a second memory element class. The second memory element class may be incompatible with the first memory element class. The processor may be configured to perform logic synthesis that adjusts the timing model of the circuit by a configuration to insert at least one first timing element into the circuit, a location connecting the at least one timing element with the at least one combinational element. The processor may be configured to perform logic synthesis that adjusts the timing model of the circuit by a configuration to perform a synthesis optimization utilizing the at least one first timing element.

In some embodiments with a system for performing logic synthesis that adjusts a timing model of a circuit before retiming, the at least one first timing element may disallow a slack value from being borrowed across the at least one combinational element. Some embodiments may further include inserting at least one second timing element into the circuit at a location of at least the first memory element or the second memory element. In some embodiments, the at least one second timing element may include a clock skew element. In some embodiments, the at least one second timing element may include a buffer element, where the buffer element adjusts the timing model of the circuit by introducing a delay into a propagated signal of the circuit. In some embodiments, the first memory element class and/or the second memory element class may be determined by at least a clock signal, a reset signal, a power signal, or an enable signal. In some embodiments, the first memory element class and/or the second memory element class may be determined by at least an inherent characteristic or a user-defined characteristic. In some embodiments, the synthesis optimization may include a technology mapping.

BRIEF DESCRIPTION OF THE DRAWINGS

The present disclosure is described in conjunction with the appended figures.

Figure 1:
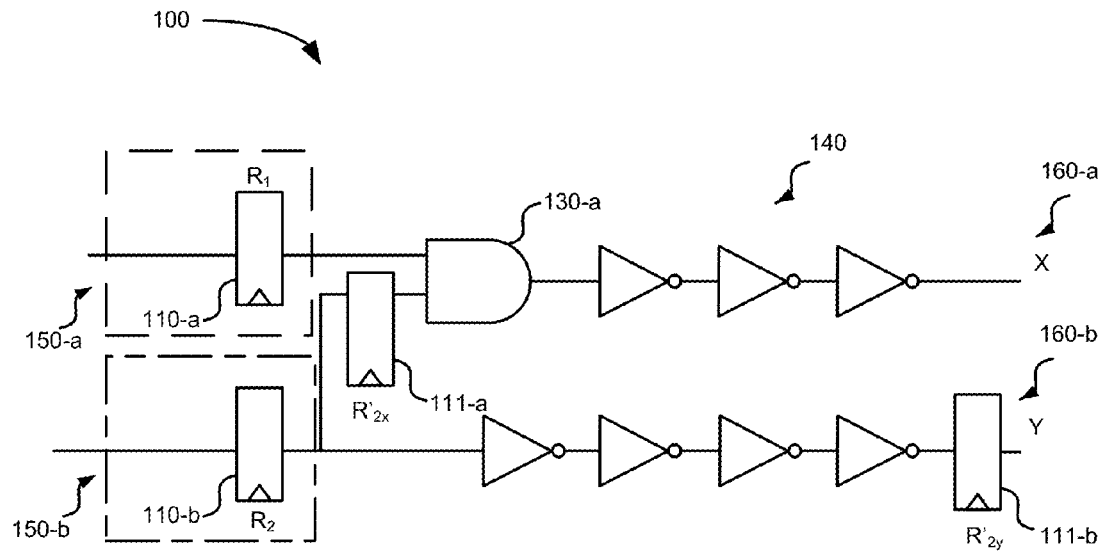
FIG. 1 depicts a circuit diagram showing a retiming class incompatibility, according to various embodiments.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Methods, systems, and machine-readable storage medium are disclosed to model the timing consequences of memory element class incompatibility during retiming (due to different clock, reset, voltage, or enable signals, merely by way of example) in the synthesis steps that may occur prior to retiming. Embodiments disclose timing elements that may be referred to as a retiming boundary buffers. The timing elements may include properties such that its delay is dependent upon its latest input arrival time or earliest output required time at the timing element. The timing elements may include properties such that its effective delay is non-symmetric (i.e. input to output and output to input are different). In some embodiments, the timing elements are able to account for and discriminate merge legality based upon retiming direction and memory element depth.

In some embodiments, a method to detect the boundaries beyond which memory elements cannot be retimed due to incompatibility is also disclosed. These locations are where the timing elements may be inserted. The disclosed timing elements, such as the retiming boundary buffer, may be utilized in conjunction with virtual negative-delay buffers and/or intentional clock skew.

Merely by way of example, embodiments may be utilized during a technology mapping that occurs before retiming. The choice of initial logic implementation may be made based upon the timing of the circuit. For example, the decisions to trade-off delay versus area and power may be dependent upon the available slack at each gate output. In some embodiments, by inserting timing elements that facilitate the correct timing model of the effect of the subsequent retiming allows the slack from other paths to be employed to reduce area and power. Furthermore, as the mapping progresses, the arrival and required times may be incrementally updated to dynamically and continuously reflect the limitations on register movement. The use of the disclosed embodiments is not limited to technology mapping before retiming, however. Merely by way of example, the disclosed embodiments may be utilized with any synthesis optimization that occurs before retiming that utilizes arrival times, required times and/or slack values. The disclosed embodiments may also be utilized in other aspects of logic synthesis that involve timing in general.

The descriptions provide several examples according to various embodiments. Throughout these descriptions, numerous circuits and their components may be described. There are numerous ways to represent circuits and their elements during logic synthesis. In general with logic synthesis, circuits may be represented on different levels, including, but not limited to, behavioral levels, a register-transfer levels (RTL), gate levels, transistor levels, and/or layout levels. Different hardware description languages (HDL) may be used to represent a circuit, including, but not limited to, VHDL and/or Verilog. In some embodiments, a circuit may also be represented as a netlist, for example. Elements within the discussed circuits may also include a variety of elements, including both memory and combinational logic elements. Memory elements may include circuit elements that may possess an internal state or be used for synchronization purposes; they may include, but are not limited to, registers, flip-flops, and latches. Combinational logic elements, which may be referred to as combinational elements herein, generally do not possess an internal state; they may include, but are not limited to, logic gates. Some embodiments may also involve libraries of elements; merely by way of example, embodiments involving technology mapping may map a target technology that may implement a technology independent network using elements from a specific library. While the descriptions may discuss specific circuits, these are for explanation purposes and do not limit the scope of the disclosure; one skilled in the art will recognize that the techniques described may be applied to other circuits in general.

With methods of retiming in general, as a memory element is retimed forward (or backward), it may merge with memory elements from other fan-ins (or fan-outs), for example. One example of a merge is retiming a multi-input combinational gate backward, which may require multiple registers on its inputs to be merged and relocated on its outputs; in some embodiments this may be described with a negative retiming lag on a multi-input gate. However, this merging operation may only be legal if both of the memory elements have a set of control signals that are identical or safe to interchange. The control signals may include a variety of different signals including, but not limited to, clock signals, reset signals, enable signals, and power signals for example. The merging operation may also only be legal if inherent or user-defined properties or characteristics are compatible, including but not limited to library domain and voltage domain, for example.

Sets of mutually compatible memory elements (e.g., registers, flip-flops, latches, etc.) may be considered as forming classes of memory elements. These classes of memory elements may be referred to as memory element classes; these classes may also be referred to as flop classes or register classes herein. A general problem of optimizing under such constraints is known as multiclass retiming. Different clock drivers may also establish different classes.

Retiming that results in a memory element being merged with another incompatible class may be considered an incompatible move. Incompatible moves should be prevented and act as boundaries to retiming. The compatibility constraints thus may limit the extent of a retiming and may be included in the timing model exposed to pre-retiming optimization.

The modeling of compatibility constraints may be complicated by the fact that the retiming movement may also result in register replication as it crosses nets (e.g., gates) with multiple fan-outs (or fan-ins). As a result, each of the replicated registers may be subject to different compatibility constraints or to no constraint at all. Referring to FIG. 1, a circuit diagram 100 is illustrated to provide merely one example reflecting this issue. Here, registers $R_1$ 110-$a$ and $R_2$ 110-$b$ are members of incompatible classes A 150-$a$ and B 150-$b$, respectively. The extent of the forward-most retiming is shown using $R'_{2x}$ 111-$a$ and $R'_{2y}$ 111-$b$. Note that no forward retiming may occur over gate 130-$a$ and along the branch 160-$a$ that terminates at X. FIG. 1 also shows other combinational elements, such as gates 140. In some embodiments, this may be reflected as having its retiming lag having a lower bound of 0. It may still be legal, however, to retime register $R_2$ forward to the end of the branch 160-$b$ that terminates at Y. Representing such a situation may be problematic with techniques that rely on adjusting the timing using single negative delay or skew values at the locations of the original memory elements. It may not be possible to capture the different compatibility constraints along multiple fan-out (or fan-in) branches with any one value at the original memory element.

If timing adjustments occur at the original memory element locations, these timing adjustments may lie somewhere between the minimum or maximum compatible movement along any branch. For example, assuming merely by way of example, unit gate delays in FIG. 1, an intentional skew of 4 at $R_2$ models the effect of retiming along branch Y, but a skew of zero models the timing along branch X. The resulting forward-most legal retiming is shown with registers $R'_{2x}$ and $R'_{2y}$. The movement of $R'_{2x}$ may be constrained due to the incompatibility of merging with $R_1$. With the minimum adjustment, it may be modeled that retiming can only move a memory element as far as it can along the most-constrained branch. With the maximum adjustment, it may be modeled that retiming can move a memory element as far as it can along the least constrained branch. With the over-conservative limitation of class compatibility, the less constrained branches may appear overly timing critical. A pre-retiming optimization may not fully exploit the ability of the subsequent retiming to balance slacks, and the quality of final result (in terms of timing, area, or any other metric of interest) may be suboptimal. With an over-approximated movement, the pre-retiming optimization may assume that retiming can compensate for a timing imbalance that it may not actually fix along the paths that are more tightly constrained by class compatibility. The result may be a circuit with timing violations or with suboptimal timing; it is possible for the timing of the final result to be worse than that of the original.

Figure 2:
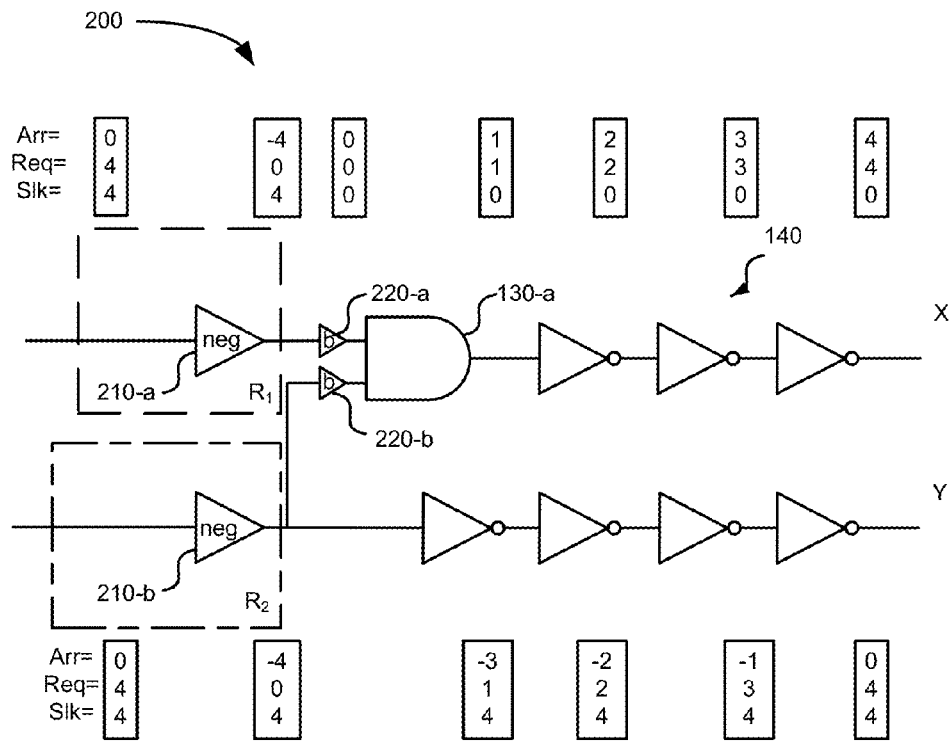
FIG. 2 depicts a circuit diagram utilizing time elements, according to various embodiments.

Referring now to FIG. 2, an example according to various embodiments shows how instead of limiting the timing adjustment to only the locations of the original memory elements, timing corrections may be allowed to occur at the locations of class incompatibility through the insertion of a timing element. FIG. 2 shows a circuit diagram 200 applying embodiments to circuit diagram 100 of FIG. 1. In some embodiments, the retime-able registers may be replaced with negative delay buffers such as elements 210-$b$ to remove the associated specific synchronization point and/or timing constraints and replace it with a combined multi-cycle path whose arrival and required times are adjusted to model the effect of an unconstrained register somewhere on the path. In other embodiments, an intentional clock skew may be used to model the unconstrained structural movement of the retime-able registers. In some embodiments, elements 210, such as negative delay buffers, intentional clock skew and/or similar technology may be used to allow a timing model to account for unconstrained retime-ability. FIG. 2 also shows timing elements 220-$a$ and 220-$b$ inserted at the locations of class incompatibility for this portion of the circuit shown. In some embodiments, timing elements 220 may be referred to as a retiming boundary buffer or a boundary buffer. These timing elements may be virtual circuit elements whose function is merely to adjust the timing model to account for compatibility constraints. These timing elements may be removed from a circuit in some embodiments before a retiming is performed on the circuit. In some embodiments, timing elements 220 may function to disallow a slack value from being borrowed across a circuit element, such as combinational logic element 130-$a$. In some configurations, timing element 220 may be coupled with the circuit element, such as circuit element 130-$a$, at a location before circuit element 220. In some cases, timing element 220 may be coupled with a circuit element after the circuit element. In some embodiments, timing elements 220 may be used in conjunction with elements 210, such as negative delay buffers, intentional clock skew, and/or similar technology. In some embodiments, timing elements 220 may contribute to the constraints of a timing model to additionally capture class incompatibility.

In some embodiments, timing elements 220 may come in different flavors, such as forward and backward. This difference may capture an incompatibility constraint for each retiming direction. Timing elements 220 may have different timing properties based in part on whether they are forward timing elements or backward timing elements.

There are numerous ways that timing elements 220 may be configured so that they may act to disallow a slack value from being borrowed across a circuit element. The following provide several examples, though other examples would fall within the scope of this disclosure for someone skilled in the art.

Some embodiments may involve describing the timing properties of timing elements 220 in terms of arrival times and required times. For example, $a_{out}$ reflect a latest arrival time at an output of an element, such as timing element 220; $a_{in}$ may reflect a latest arrival time at an input of an element, such as timing element 220. Other elements in a circuit may also have latest arrival times for the input and/or output for the element. In some embodiments, $r_{in}$ may reflect an earliest required time at an input of an element, such as timing element 220; $r_{out}$ may reflect an earliest required time at an output of an element, such as timing element 220. Other elements in a circuit may also have earliest required times in their inputs and outputs. Some timing elements 210 may also include timing properties that are based on a clock period T of a subsequent memory element in a direction of a timing propagation.

In some embodiments, a forward timing element, which may be a forward boundary buffer, may have the following timing properties:

$$a_{out}=\max(a_{in},0)$$

$$r_{in}=r_{out} \quad \text{(Equations A).}$$

In some embodiments, a backward timing element, which may be a backward boundary buffer, may have the following timing properties:

$$r_{in}=\min(r_{out},T)$$

$$a_{out}=a_{in} \quad \text{(Equations B).}$$

Some embodiments may allow a timing element such as a retiming boundary buffer to take into account the number of levels of memory elements that may lie between an illegal merge point and a memory element that causes the conflict. This may be represented, merely by way of example, as a value k. Utilizing this value k, some embodiments may include timing properties for timing elements such as boundary buffers that take value k into account. Merely by way of example, some embodiments of a forward timing element such as a forward boundary buffer may have the following timing properties:

$$a_{out}=\max(a_{in},-kT)$$

$$r_{in}=r_{out} \quad \text{(Equations C).}$$

One may note that this may be seen as a generalization of Equations A. Some embodiments of a backward timing element such as a backward boundary buffer may similarly generalize Equations B, resulting in the following timing properties:

$$r_{in}=\min(r_{out},(k+1)T)$$

$$a_{out}=a_{in} \quad \text{(Equations D).}$$

The effect of these timing properties may be to cap minimum arrival times and maximum required times. As a result, the amount of slack seen in the restricted direction of retiming may be decreased. In some embodiments, the net effect is to disallow any slack from being borrowed across the location of the timing element that may require incompatible memory elements from being retimed through the same point. Furthermore, while the above Equations A, B, C, and D may be used in embodiments to provide timing properties for timing elements such as retiming boundary buffers, other timing properties may also be used in different embodiments.

Referring again to FIG. 2, this figure shows the circuit portion from FIG. 1 after the insertion of two forward timing elements 220-*a* and 220-*b*. In some embodiments, memory elements such as 110-*a* and 110-*b* from FIG. 1 may be replaced with negative delay buffers such as 210-*a* and 210-*b*. Some embodiments may utilize intentional clock skew along with memory elements 110-*a* and 110-*b*. For the purposes of explanation, the following description provides specific values for some arrival times, required times, and clock periods; however, other values may be utilized within the scope of various embodiments. Merely by way of example, it will be assumed that combinational logic elements such as 130 and 140 have unit delay, though in other embodiments, other delays may be utilized. Merely by way of example, the arrival time at memory element input is also given to be 0 and the required time at the outputs is 4. Merely by way of example, the periods of the clocks of memory elements 110-*a* and 110-*b* are both 4. The output of each element has been labeled with latest arrival time, the earliest required arrival time, and the slack, in that order.

FIG. 2 shows that in some embodiments the arrival times along one path, such as path X, may be much later than those along another path, such as path Y, even though the cumulative delay through the physical elements is identical. In some embodiments, the effect will be to make one branch appear relatively more timing critical than another branch. This effect can be the case after retiming.

Figure 3:
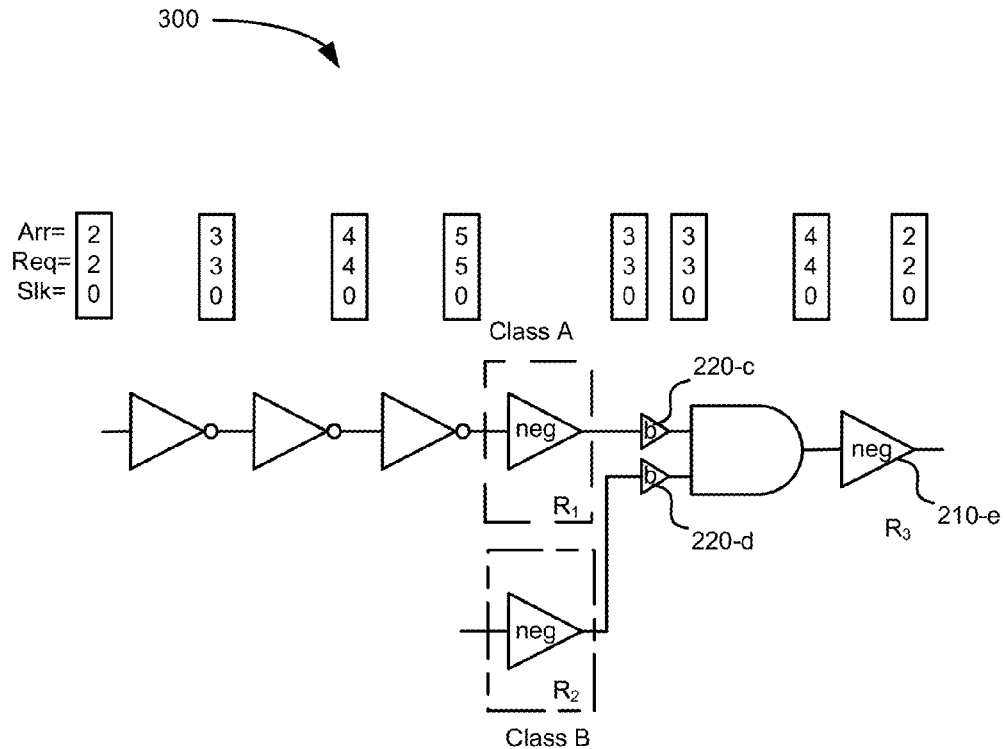
FIG. 3 depicts another circuit diagram utilizing time elements, according to various embodiments.

Referring now to FIG. 3, this figure shows a circuit diagram 300 that reflects that in some embodiments the propagation of timing across timing elements may be nonsymmetrical. Circuit diagram 300 reflects that in some embodiment the use of timing elements such as 220 may correctly reflect the unidirectional nature of some compatibility constraints. FIG. 3 illustrates a situation where it may be desirable to retime over timing elements 220-*c* and 220-*d* in the non-compatibility-constrained direction. For the purposes of explanation, specific arrival times, required times, and clock periods will be utilized in the following description; however, these specific values should not be seen as limiting the possible values that may be utilized. Merely by way of example, assuming an arrival at the input of 2, and a required time at the output of 2, it is possible to meet a target clock period of 2. However, this aspect may require memory element $R_3$, represented here merely for example purposes as a negative delay buffer 210-*e*, to move over the forward retiming boundary buffer timing elements 220-*c* and 220-*d*. The arrival and required times are displayed at the nodes along the critical path. It can be seen that the slack is uniformly zero. The adjusted timing may thus correctly capture that it is possible to meet the delay constraints after retiming. The non-symmetry of arrival and required time propagation may reflect that there does not exist a notion of effective delay in some embodiments, as may be the case with traditional timing elements. However, because these are virtual elements in some embodiments and do not need to actually be manipulated in any way outside of timing analysis, timing elements such as 220-*c* and 220-*d* can be fully compatible with combinational synthesis methods. Merely by way of example, combinational synthesis techniques such as technology mapping may be compatible with the use of the disclosed timing elements and techniques.

Figure 4:
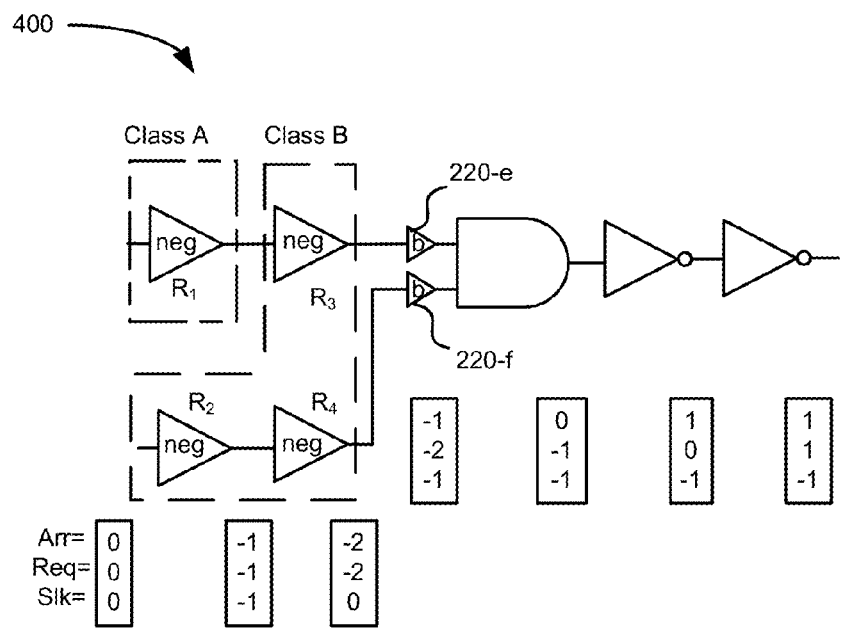
FIG. 4 depicts another circuit diagram utilizing time elements, according to various embodiments.

Referring now to FIG. 4, this figure shows a circuit diagram 400 that provides an example of an embodiment where a timing element, such as timing element 220-*e*, may be separated from incompatible memory elements by a level of compatible memory elements. Here, memory element $R_1$ is given to be in a first class and memory elements $R_2$, $R_3$, and $R_4$ in a second class that is incompatible with the first class. Timing elements 220-*e* and 220-*f* may be inserted to prevent a merge between R1 and R2, because one level of memory elements (e.g., R3 and R4) lies between the timing elements and the incompatible pair. In this case, the k-value for the timing elements is 1. The resulting arrival and required times and slacks are displayed. As a result, the slacks beyond the point of compatibility boundary may be made more critical than before the insertion of the timing elements In some embodiments, the introduction of timing elements that may be boundary buffers may be in multiple steps. Merely by way of example, the introduction of timing elements may be performed in two independent steps, one for each direction of memory element movement. The following description provides merely one way that timing elements may be introduced in a forward direction for some embodiments; an analogous backward procedure may also be done. Other embodiments may introduce these elements in different ways.

Figure 5:
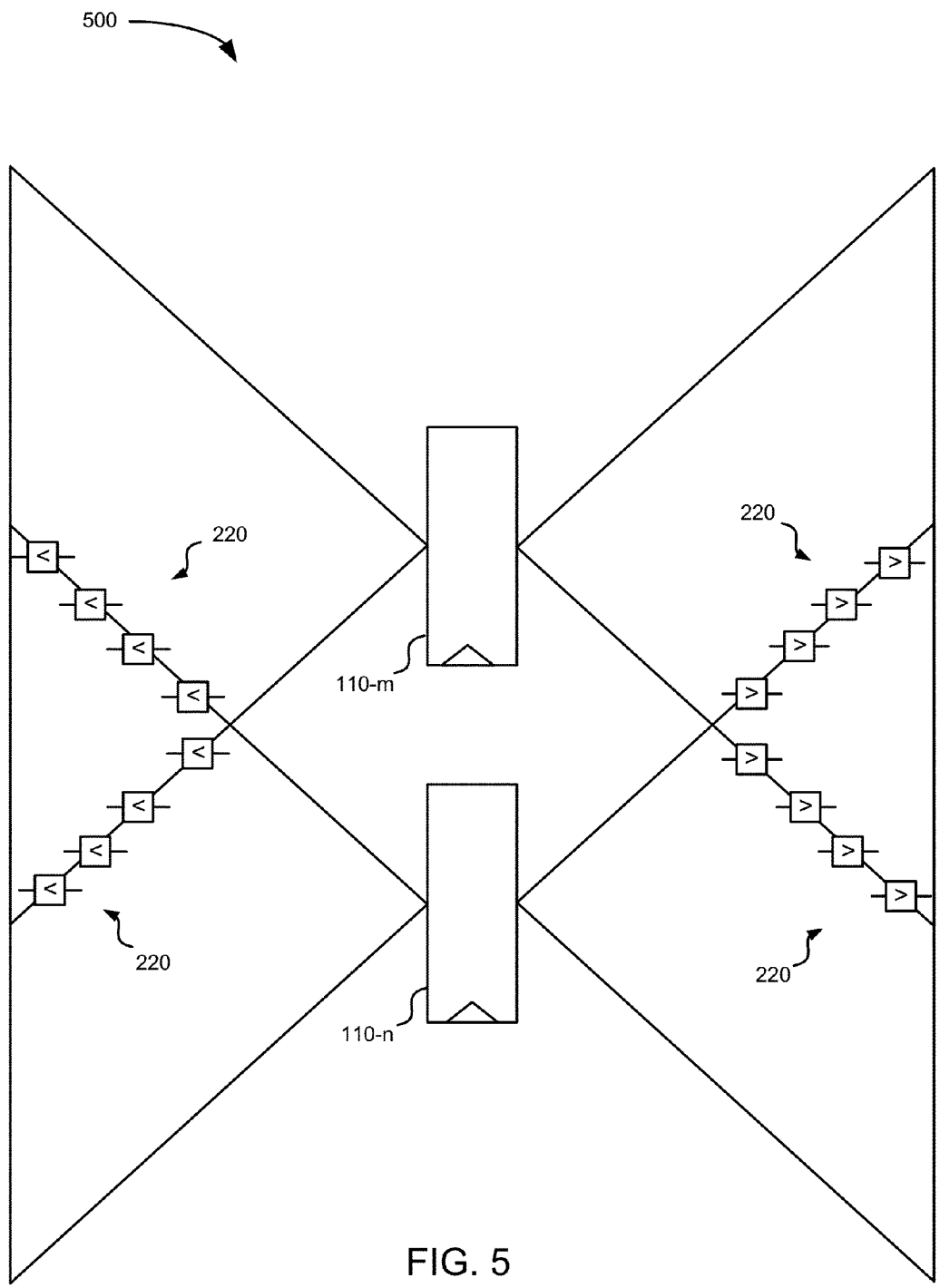
FIG. 5 depicts a circuit diagram utilizing showing class incompatibility boundaries in a circuit with timing elements inserted, according to various embodiments.

Some embodiments may identify the boundaries between incompatible regions. In some cases, timing elements 220, such as boundary buffers, may be inserted at the input pin(s) of for the combinational elements, such as gates, at each boundary. In some embodiments, this insertion procedure will be done for every combinational element along a boundary between incompatible regions. In some cases, timing elements 220 may be inserted at the output pin(s) of a combinational element. This type of insertion may be the case for combinational elements like multi-drivers. At each boundary point, a minimum sequential depth to an incompatible set of memory elements (which may be reflected as its k-value) may also be established. FIG. 5 provides a circuit diagram 500 with timing elements 220 that have been introduced in both forward directions and backward directions with respect to memory elements 110-$m$ and 110-$n$.

In some embodiments, the location to insert timing elements 220 may begin with a k-value=0. Starting with each memory element, such as memory elements 110-$m$ and 110-$n$ in FIG. 5, a class identifier for each memory element may be propagated forward through the combinational circuit elements. The class identifier may reflect one or more of control signals for the memory element. The propagation of a class identifier may occur in topological order. If a combinational element is reached with different identifiers at its inputs, a timing element 220 may be inserted (with the current k-value) and the propagation discontinued at this node. In some embodiments, the propagation also does not continue through any existing memory elements, as these memory elements would have been blocked by an earlier incompatible merge. In some embodiments, multiple passes may be made, where the depth k is changed. For example, once each traversal of a circuit has been completed for a depth k, another pass may be begun with a depth k+1. The class identifiers from the previous pass (that have reached a memory element input) may be propagated forward from the memory element output—not the identifier of the memory element. In some embodiments, a maximum number of passes may be constrained by the maximum sequential depth of the circuit (from any memory element to an output).

In some embodiments, the number of iterations can be further reduced by pre-computing the range of class unconstrained retiming lag bounds. Generally the largest lag magnitude may be small both absolutely and relative to the maximum sequential depth. Merely by way of example, FIG. 5 may reflect a result for a case involving memory elements 110-$m$ and 110-$n$, with multiple timing elements inserted along resulting boundaries in both the forward and backward directions.

Figure 6:
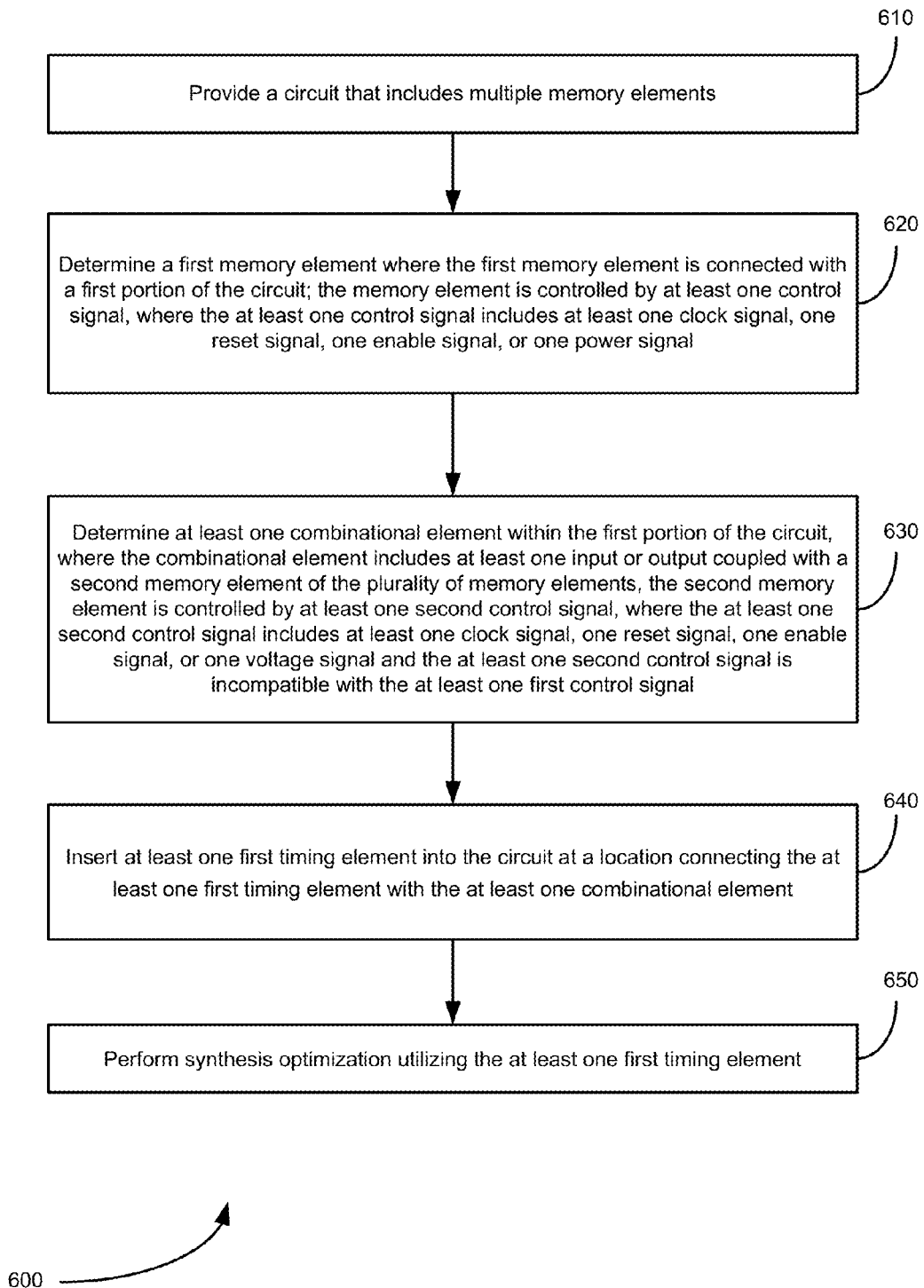
FIG. 6 illustrates a flow chart reflecting a method of logic synthesis adjusting a timing model of a circuit, according to various embodiments.

Referring next to FIG. 6, this figure shows a flow chart for a method 600 of logic synthesis for adjusting a timing model of a circuit according to various embodiments. Method 600 may be implemented using many of the aspects discussed with respect to FIGS. 1-5. At block 610, a circuit is provided that includes multiple memory elements. At block 620, a first memory element is determined where the first memory element is connected with a first portion of the circuit; the memory element is controlled by at least one control signal, where the at least one control signal includes at least one clock signal, one reset signal, one enable signal, or one voltage signal. At block 630, at least one combinational element is determined within the first portion of the circuit. The combinational element includes at least one input or output coupled with a second memory element of the plurality of memory elements. The second memory element is controlled by at least one second control signal, where the at least one second control signal includes at least one clock signal, one reset signal, one enable signal, or one voltage signal and the at least one second control signal is incompatible with the at least one first control signal. At block 640, at least one first timing element is inserted into the circuit at a location connecting the at least one first timing element with the at least one combinational element performing a synthesis optimization utilizing the at least one first timing element. At block 650, a synthesis optimization utilizing the at least one timing element is performed.

Figure 7:
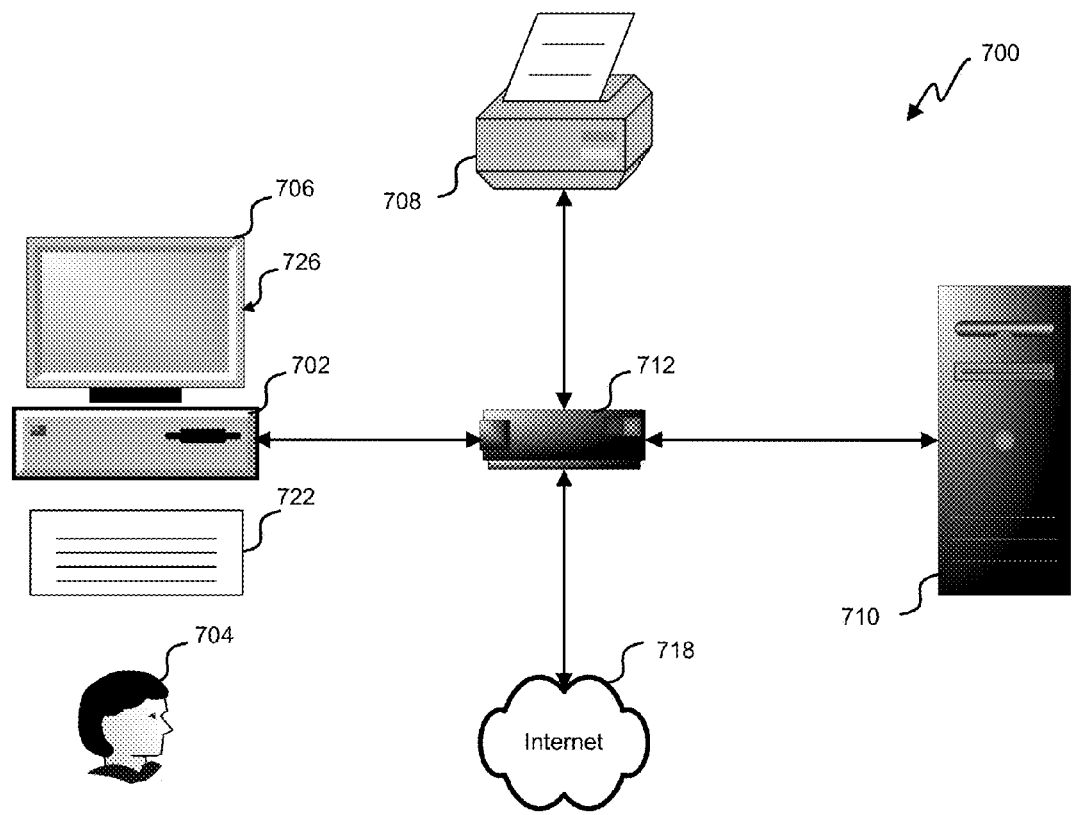
FIG. 7 depicts a block diagram of an embodiment of a CAD system.

Referring next to FIG. 7, an exemplary environment with which embodiments of the invention may be implemented is shown with a computer aided design (CAD) system 700 that can be used by a designer 704 to design, for example, electronic circuits. The CAD system 700 can include a computer 702, keyboard 722, a network router 712, a printer 708, and a monitor 706. The monitor 706, processor 702 and keyboard 722 are part of a computer system 726, which can be a laptop computer, desktop computer, handheld computer, mainframe computer, etc. The monitor 706 can be a cathode ray tube (CRT), flat screen, etc.

A circuit designer 704 can input commands into the processor 702 using various input devices, such as a mouse, keyboard 722, track ball, touch screen, etc. If the CAD system 700 comprises a mainframe, a designer 704 can access the computer 702 using, for example, a terminal or terminal interface. Additionally, the computer system 726 may be connected to a printer 708 and a server 710 using a network router 712, which may connect to the Internet 718 or a WAN.

The server 710 may, for example, be used to store additional software programs and data. In one embodiment, software implementing the systems and methods described herein can be stored on a storage medium in the server 710. Thus, the software can be run from the storage medium in the server 710. In another embodiment, software implementing the systems and methods described herein can be stored on a storage medium in the computer 702. Thus, the software can be run from the storage medium in the computer system 726. Therefore, in this embodiment, the software can be used whether or not computer 702 is connected to network router 712. Printer 708 may be connected directly to computer 702, in which case, the computer system 726 can print, whether or not it is connected to network router 712.

Figure 8:
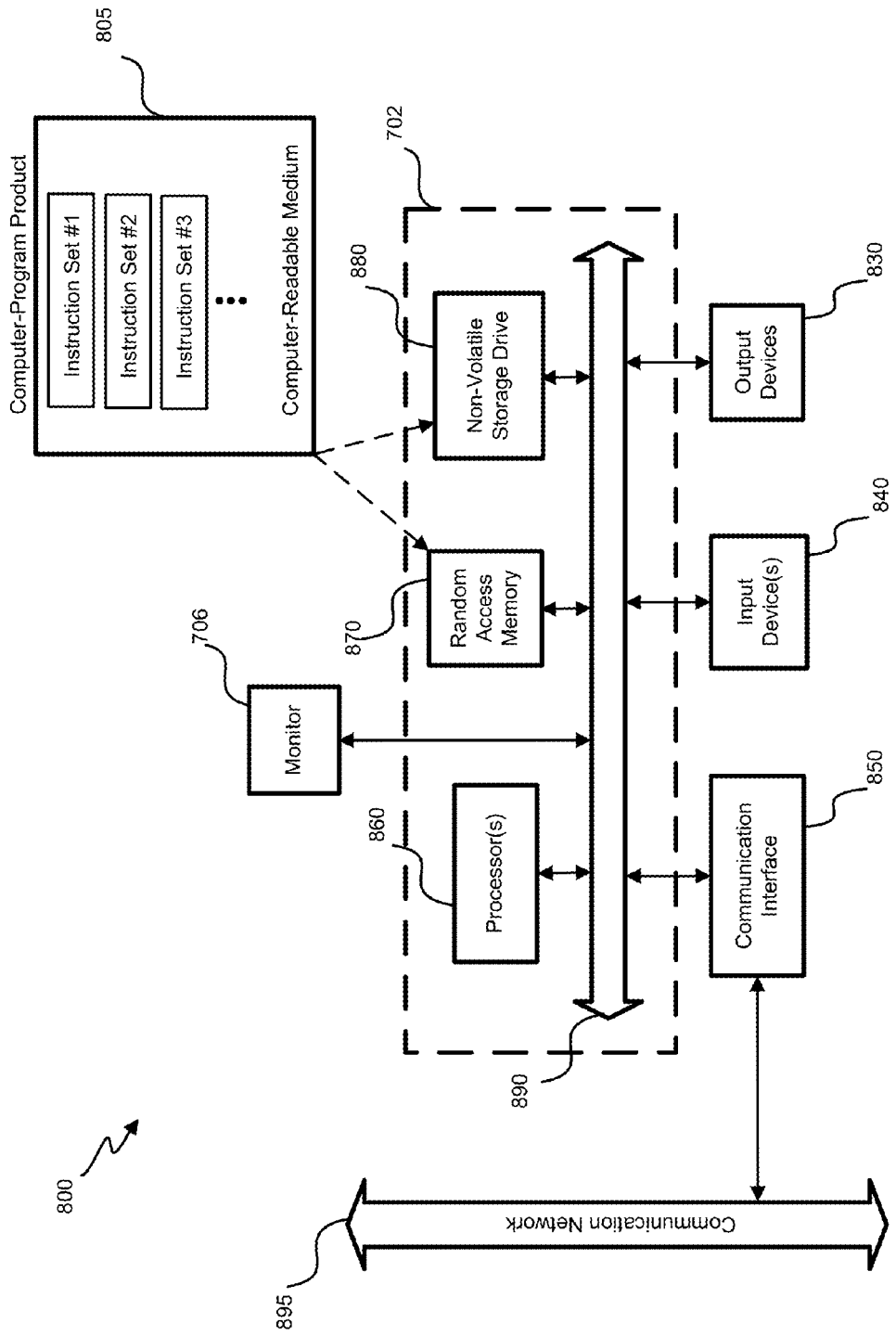
FIG. 8 depicts a block diagram of an embodiment of a special-purpose computer.

With reference to FIG. 8, an embodiment of a special-purpose computer system 800 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 726, it is transformed into the special-purpose computer system 800 for CAD.

Special-purpose computer system 800 comprises a computer 702, a monitor 706 coupled to computer 702, one or more additional user output devices 830 (optional) coupled to computer 702, one or more user input devices 840 (e.g., keyboard, mouse, track ball, touch screen) coupled to computer 702, an optional communications interface 850 coupled to computer 702, a computer-program product 805 stored in a tangible computer-readable memory in computer 702. Computer-program product 805 directs system 800 to perform the above-described methods. Computer 702 may include one or more processors 860 that communicate with a number of peripheral devices via a bus subsystem 890. These peripheral devices may include user output device(s) 830, user input device(s) 840, communications interface 850, and a storage subsystem, such as random access memory (RAM) 870 and non-volatile storage drive 880 (e.g., disk drive, optical drive, solid state drive), which are forms of tangible computer-readable memory.

Computer-program product 805 may be stored in non-volatile storage drive 880 or another computer-readable medium accessible to computer 702 and loaded into memory 870. Each processor 860 may comprise a microprocessor, such as a microprocessor from Intel® or Advanced Micro Devices, Inc.®, or the like. To support computer-program product 805, the computer 702 runs an operating system that handles the communications of product 805 with the above-noted components, as well as the communications between the above-noted components in support of the computer-program product 805. Exemplary operating systems include Windows® or the like from Microsoft Corporation, Solaris® from Sun Microsystems, LINUX, UNIX, and the like.

User input devices 840 include all possible types of devices and mechanisms for inputting information to computer system 702. These may include a keyboard, a keypad, a mouse, a scanner, a digital drawing pad, a touch screen incorporated into the display, audio input devices such as voice recognition systems, microphones, and other types of input devices. In various embodiments, user input devices 840 are typically embodied as a computer mouse, a trackball, a track pad, a joystick, wireless remote, a drawing tablet, a voice command system. User input devices 840 typically allow a user to select objects, icons, text and the like that appear on the monitor 706 via a command such as a click of a button or the like. User output devices 830 include all possible types of devices and mechanisms for outputting information from computer 702. These may include a display (e.g., monitor 706), printers, non-visual displays such as audio output devices, etc.

Communications interface 850 provides an interface to other communication networks and devices and may serve as an interface for receiving data from and transmitting data to other systems, WANs and/or the Internet 718. Embodiments of communications interface 850 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 850 may be coupled to a computer network, to a FireWire® bus, or the like. In other embodiments, communications interface 850 may be physically integrated on the motherboard of computer 702, and/or may be a software program, or the like.

RAM 870 and non-volatile storage drive 880 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 870 and non-volatile storage drive 880 may be configured to store the basic programming and data constructs that provide the functionality of various embodiments of the present invention, as described above.

Software instruction sets that provide the functionality of the present invention may be stored in RAM 870 and non-volatile storage drive 880. These instruction sets or code may be executed by the processor(s) 860. RAM 870 and non-volatile storage drive 880 may also provide a repository for storing data and data structures used in accordance with the present invention. RAM 870 and non-volatile storage drive 880 may include a number of memories including a main random access memory (RAM) for storage of instructions and data during program execution and a read-only memory (ROM) in which fixed instructions are stored. RAM 870 and non-volatile storage drive 880 may include a file storage subsystem providing persistent (non-volatile) storage for program and/or data files. RAM 870 and non-volatile storage drive 880 may also include removable storage systems, such as removable flash memory.

Bus subsystem 890 provides a mechanism for letting the various components and subsystems of computer 702 communicate with each other as intended. Although bus subsystem 890 is shown schematically as a single bus, alternative embodiments of the bus subsystem may utilize multiple busses or communication paths within the computer 702.

While the principles of the disclosure have been described above in connection with specific apparatuses, systems, and methods, it is to be clearly understood that this description is made only by way of example and not as limitation on the scope of the disclosure.

What is claimed is:

1. A computer-implemented method of logic synthesis for adjusting a timing model of a circuit, the method comprising:
providing the circuit, wherein the circuit includes a plurality of memory elements;
determining a first memory element from the plurality of memory elements, wherein the first memory element is connected with a first portion of the circuit and is controlled by at least one first control signal, wherein the at least one first control signal includes at least one clock signal, one reset signal, one enable signal, or one power signal;
determining at least one combinational element within the first portion of the circuit, wherein the at least one combinational element includes at least one input or output coupled with a second memory element of the plurality of memory elements, wherein the second memory element is controlled by at least one second control signal, wherein the at least one second control signal includes at least one clock signal, one reset signal, one enable signal, or one power signal and the at least one second control signal is incompatible with the at least one first control signal;
inserting at least one first timing element into the circuit at a location connecting the at least one first timing element with the at least one combinational element, wherein timing properties of the at least one first timing element are related to a clock period of a memory element in a direction of a timing propagation, a number of levels of memory elements that lie between the location of the first memory element and the at least one combinational element, a latest arrival time at an input of the at least one first timing element, and an earliest required time at the output of the at least one first timing element; and performing, using a computer, a synthesis optimization of the circuit with the at least one first timing element inserted.

2. The computer-implemented method recited in claim 1, wherein the at least one first timing element disallows a slack value from being borrowed across the at least one combinational element.

3. The computer-implemented method recited in claim 1, further comprising inserting at least one second timing element into the circuit at a location of at least the first memory element or the second memory element.

4. The computer-implemented method recited in claim 3, wherein the at least one second timing element comprises a clock skew element.

5. The computer-implemented method recited in claim 3, wherein the at least one second timing element comprises a buffer element, wherein the buffer element adjusts the timing model of the circuit by introducing a delay into a propagated signal of the circuit.

6. The computer-implemented method recited in claim 1, wherein the at least one first timing element comprises a forward timing element with a set of timing properties expressed as:

$$a_{out} = \max(a_{in}, -kT)$$

$$r_{in} = r_{out}$$

where:
- $a_{out}$ is a latest arrival time at an output of the forward timing element;
- $a_{in}$ is a latest arrival time at an input of the forward timing element,
- k is a number of levels of memory elements that lie between the location of the first memory element and the at least one combinational element;
- T is a clock period of a next memory element in a direction of a timing propagation;
- $r_{in}$ is an earliest required time at the input of the forward timing element; and
- $r_{out}$ is an earliest required time at the output of the forward timing element.

7. The computer-implemented method recited in claim 1, wherein the at least one first timing element comprises a backward timing element with a set of timing properties expressed as:

$$r_{in} = \min(r_{out}, (k+1)T)$$

$$a_{out} = a_{in}$$

where:
- $a_{out}$ is a latest arrival time at an output of the backward timing element;
- $a_{in}$ is a latest arrival time at an input of the backward timing element;
- k is a number of levels of memory elements that lie between the location of the first memory element and the at least one combinational element;
- T is a clock period of a next memory element in a direction of a timing propagation;
- $r_{in}$ is an earliest required time at the input of the backward timing element; and
- $r_{out}$ is an earliest required time at the output of the backward timing element.

8. The computer-implemented method recited in claim 1, wherein the synthesis optimization comprises a technology mapping.

9. A machine-readable storage medium comprising executable instructions which, when executed by a computer, performs logic synthesis that adjusts a timing model of a circuit, the executable instructions comprising code for:

providing the circuit, wherein the circuit includes a plurality of memory elements;

determining a first memory element from the plurality of memory elements, wherein the first memory element is controlled by a first signal and is coupled with a first portion of the circuit;

determining at least one combinational element within the first portion of the circuit, wherein the at least one combinational element includes at least one input or output coupled with a second memory element of the plurality of memory elements, wherein the second memory element is controlled by a second signal, wherein the second signal is incompatible with the first signal;

inserting at least one first timing element into the circuit at a location connecting the at least one first timing element with the at least one combinational element, wherein timing properties of the at least one first timing element are related to a clock period of a memory element in a direction of a timing propagation, a number of levels of memory elements that lie between the location of the first memory element and the at least one combinational element, a latest arrival time at an input of the at least one first timing element, and an earliest required time at the output of the at least one first timing element; and performing a synthesis optimization of the circuit with the at least one first timing element inserted.

10. The machine-readable storage medium comprising executable instructions for performing logic synthesis that adjusts a timing model of a circuit recited in claim 9, wherein the at least one first timing element disallows a slack value from being borrowed across the at least one combinational element.

11. The machine-readable storage medium comprising executable instructions for performing logic synthesis that adjusts a timing model of a circuit recited in claim 9, the executable instructions further comprising inserting at least one second timing element into the circuit at a location of at least the first memory element or the second memory element.

12. The machine-readable storage medium comprising executable instructions for performing logic synthesis that adjusts a timing model of a circuit recited in claim 11, wherein the at least one second timing element comprises a clock skew element.

13. The machine-readable storage medium comprising executable instructions for performing logic synthesis that adjusts a timing model of a circuit recited in claim 11, wherein the at least one second timing element comprises a buffer element, wherein the buffer element adjusts the timing model of the circuit by introducing a delay into a propagated signal of the circuit.

14. The machine-readable storage medium comprising executable instructions for performing logic synthesis that adjusts a timing model of a circuit recited in claim 9, wherein the first signal and the second signal include at least a clock signal, a reset signal, a voltage signal, or an enable signal.

15. The machine-readable storage medium comprising executable instructions for performing logic synthesis that adjusts a timing model of a circuit recited in claim 9, wherein the synthesis optimization comprises a technology mapping.

16. A system for performing logic synthesis that adjusts a timing model of a circuit before retiming, the system comprising:

a storage medium;

a processor coupled with the storage medium, the processor configured to perform logic synthesis that adjusts the timing model of the circuit by a configuration to:

produce the circuit, wherein the circuit includes a plurality of memory elements;

determine a first memory element from the plurality of memory elements, wherein the first memory element is a member of a first memory element class and is coupled with a first portion of the circuit;

determine at least one combinational element within the first portion of the circuit, wherein the at least one combinational element includes at least one input or output coupled with a second memory element of the plurality of memory elements, wherein the second memory element is a member of a second memory element class, wherein the second memory element class is incompatible with the first memory element class;

insert at least one first timing element into the circuit a location connecting the at least one timing element with the at least one combinational element, wherein timing properties of the at least one first timing element are related to a clock period of a memory element in a direction of a timing propagation, a number of levels of memory elements that lie between the location of the first memory element and the at least one combinational element, a latest arrival time at an input of the at least one first timing element, and an earliest required time at the output of the at least one first timing element; and performing a synthesis optimization of the circuit with the at least one first timing element inserted.

17. The system recited in claim 16, wherein the at least one first timing element disallows a slack value from being borrowed across the at least one combinational element.

18. The system recited in claim 16, further comprising inserting at least one second timing element into the circuit at a location of at least the first memory element or the second memory element.

19. The system recited in claim 18, wherein the at least one second timing element comprises a clock skew element.

20. The system recited in claim 18, wherein the at least one second timing element comprises a buffer element, wherein the buffer element adjusts the timing model of the circuit by introducing a delay into a propagated signal of the circuit.

21. The system recited in claim 16, wherein one or both of the first memory element class and the second memory element class are determined by at least a clock signal, a reset signal, a power signal, or an enable signal.

22. The system recited in claim 16, wherein one or both of the first memory element class and the second memory element class are determined by at least an inherent characteristic or a user-defined characteristic.

23. The system recited in claim 16, wherein the synthesis optimization comprises a technology mapping.

* * * * *